Jan. 24, 1956    A. RESCH    2,732,218
FOLDABLE WHEEL ASSEMBLY FOR GOLF BAG CARTS
Filed June 28, 1955    2 Sheets-Sheet 1

Anton Resch
  INVENTOR.

Jan. 24, 1956  A. RESCH  2,732,218
FOLDABLE WHEEL ASSEMBLY FOR GOLF BAG CARTS
Filed June 28, 1955  2 Sheets-Sheet 2

Anton Resch
INVENTOR.

| United States Patent Office | 2,732,218
Patented Jan. 24, 1956 |

2,732,218
FOLDABLE WHEEL ASSEMBLY FOR GOLF BAG CARTS

Anton Resch, Rockwell City, Iowa

Application June 28, 1955, Serial No. 518,504

6 Claims. (Cl. 280—38)

This invention comprises novel and useful improvements in a golf bag cart and more specifically pertains to a golfer's caddy cart for storing golf clubs and golf balls in an improved manner and with a foldable wheel and handle assembly whereby the device may be collapsed into a compact assembly to facilitate transportation and storage of the same.

The principal object of this invention is to provide a golf bag cart having an improved foldable handle and wheel assembly whereby the device may be readily collapsed into a compact arrangement for easy and convenient transportation and storage of the same; and may be readily opened and securely assembled into an erect or expanded position to function as a golf caddy cart.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
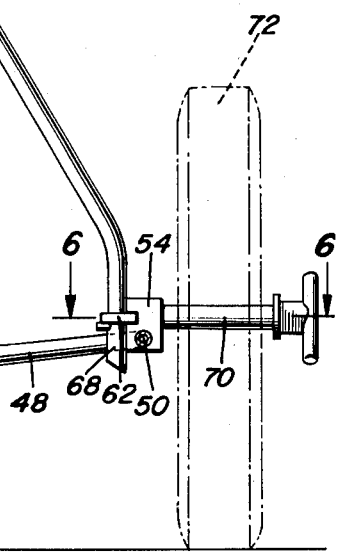
Figure 6:
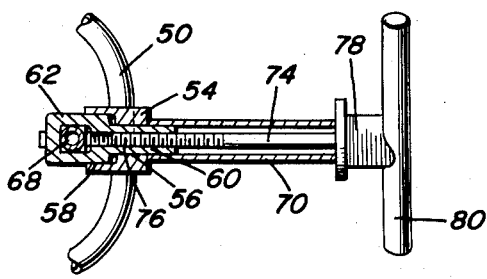

Figure 5 is a detail view taken upon an enlarged scale and showing in vertical elevation and vertical section the manner in which the foldable wheel assembly is secured to the body of the golf cart; and Figure 6 is a detailed view taken in horizontal section substantially upon the plane of section line 6—6 of Figure 5 and showing the construction of the means for securing the wheel upon the wheel spindle, and for locking the spindle and the member carrying the same in either the collapsed or the erected position of the wheel assembly.

Disclosed in the accompanying drawings as an illustration only of one satisfactory manner of practicing the principles of this invention is a golf bag cart or golf caddy cart consisting of a body indicated generally by the numeral 10 and which has a foldable wheel assembly designated generally by the numeral 12. The novel feature of the present invention resides more particularly in the construction of the foldable wheel assembly, as set forth hereinafter, since it will be readily understood that the same may be employed with various types of bodies.

Figure 3:
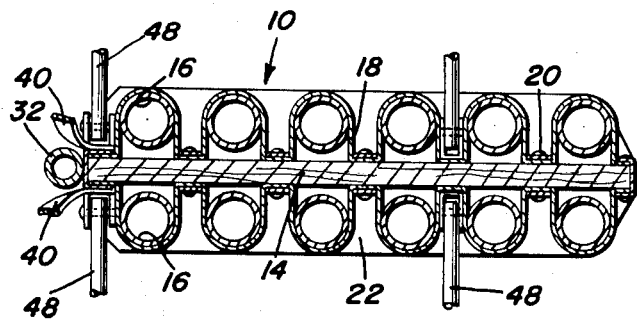
Figure 3 is a horizontal sectional detailed view taken upon an enlarged scale substantially upon the plane indicated by section line 3—3 of Figure 1 and showing more clearly the construction of the golf club receiving compartments of the cart.

Referring primarily to Figure 3 it will be seen that the body 10 consists of an elongated flat panel 14 of any desired material such as wood, plastic or the like, and which is positioned vertically and centrally of the body and forms a rigid backbone for the same. Mounted upon opposite sides of the panel 14 in order to produce a compact and a balanced arrangement, are a plurality of cylindrical members 16 of any desired size and material and which serve as compartments or pockets for receiving and supporting in a readily accessible and compact manner the handles of golf clubs, as will be apparent from Figure 4. A pair of fluted metallic casings 18 are provided upon the opposite sides of the panel 14, the flutes of these casings serving to receive and embrace the cylindrical members 16 and assist in maintaining the same in a rigid assembled relation upon the panel, by means of suitable fasteners 20 which extend between the flutes and are secured to the panel 14.

Secured to the bottom edge of the panel 14 and constituting a closure for and supporting the bottom ends of the cylindrical members 16 is a plate 22 comprising a bottom wall for the body. Secured to and depending beneath this plate is a U-shaped bracket 24 comprising a supporting leg which cooperates with the collapsible wheel assembly, as set forth hereinafter, to support the body in an erect position as shown in Figure 4.

Figure 2:
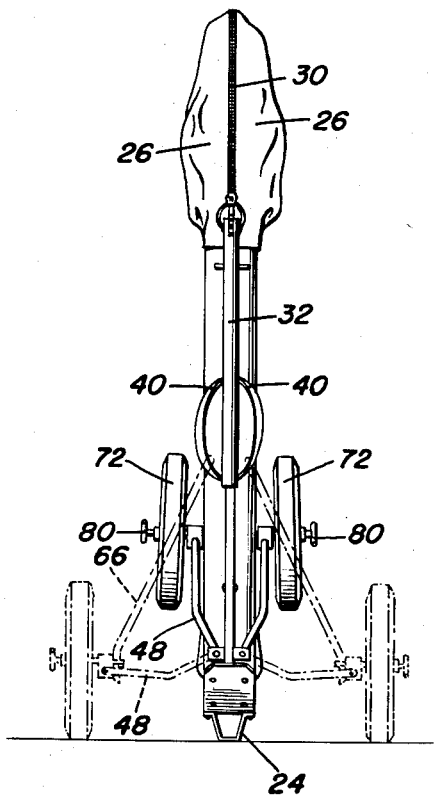
Figure 2 is an end elevational view of the arrangement of Figure 1, taken from the left end thereof, the collapsed position of the wheel assembly being shown in full lines therein, and the expanded or erect position of the same being shown in dotted lines.

Secured to the upper end of the body upon opposite sides of the panel are a pair of pockets 26 of a pliable or flexible material and which have zippered openings 28 for the reception of golf balls, golf tees or other golf equipment. Preferably, the two pocket members 26 are provided with a zippered fastener 30 upon their mating edges whereby the same may be secured as shown in Figure 2 to constitute a closure for and a retainer for the golf clubs and prevent their unauthorized withdrawal from the compartment 16.

Figure 1:
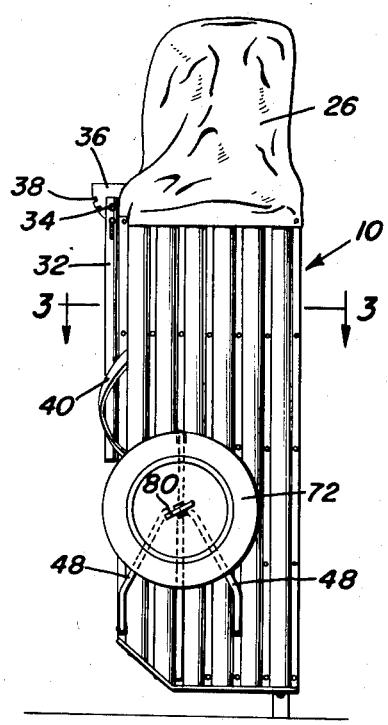
Figure 1 is a side elevational view showing the golf bag cart in its collapsed or stored position.
Figure 4:
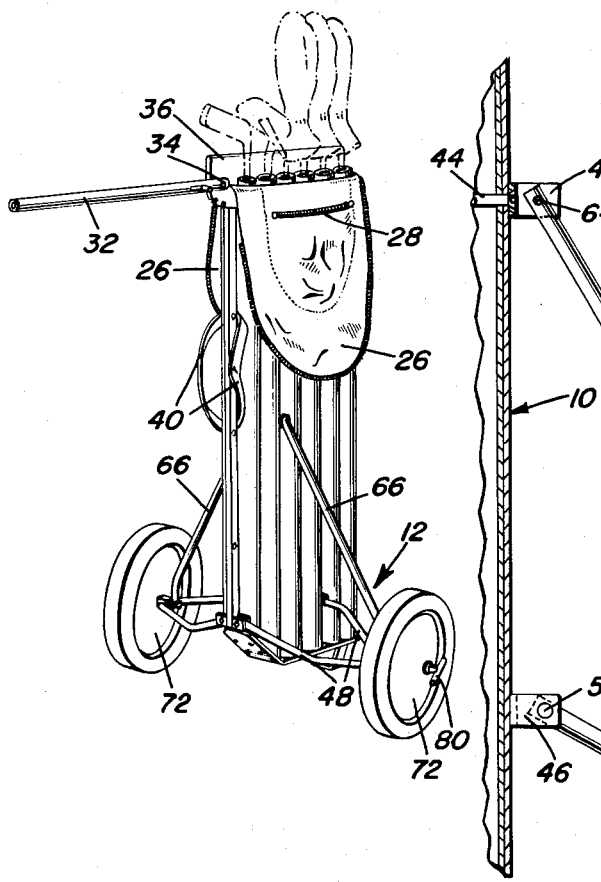
Figure 4 is a perspective view of the device in its erected position ready for employment as a caddy cart.

A rod 32 comprising a handle is pivoted at 34 to the upper portion of a transverse bar or plate 36 secured to the panel and extending upwardly therefrom, and this bar may be provided with a notched quadrant or sector portion 38 whereby the handle 32 may be secured in either an extended and operative position as shown in Figure 4 or may be folded into a collapsed position against the side of the body, as in Figure 1.

The body may be further provided with a pair of supporting straps 40 attached thereto whereby when the handle is folded and the wheel assembly is collapsed, the golf bag cart may be readily transported as desired.

Reference is now made particularly to Figures 4, 5 and 6 for a consideration of the foldable wheel assembly which constitutes the essential feature of this invention. As will be best seen from Figures 3, 4 and 5, each side of the body is provided with a laterally extending upper U-shaped bracket 42 secured to the body as by a fastener 44; and a pair of lower U-shaped brackets 46 likewise secured to the body. The three brackets upon each side of the body constitute means for mounting upon the body the foldable wheel assemblies in accordance with this invention.

Each wheel assembly consists of a wheel support comprising a rod having a pair of legs 48, which at one end are provided with a cross-rod or connecting portion 50, and at their other ends are pivoted to the lower brackets 46 as by pivot means 52. Pivotally mounted upon the cross-rod 50 is a member 54. The member 54 is provided with a bore extending therethrough which bore is spaced from and is perpendicular to the bore in which the cross-rod 50 is journaled. This perpendicular bore consists of a main passage 56 which at one end is counterbored as at 58. Slidable in this bore is a retainer consisting of an internally threaded tubular stem 60 which is slidably received in the main bore 56, and a laterally enlarged plate-like frame 62 which is slidably received and is guided for sliding movement in the counterbore 58. Pivoted at its upper end as by means of a pivot pin 64 to the upper bracket 42 is a brace rod 66 whose lower extremity 68 is angulated and is slidably received within the aperture extending through the frame-like retainer 62.

The association of these members is shown best in Figure 6, and from a study of that figure in conjunction with Figure 5, it will be seen that when the leg assembly 48 is pivoted about its pivot pins 52 from its extended position shown in Figure 5 towards its closed or folded position, shown in Figure 1 and in full lines in Figure 2, the brace rod 66 will slide through the aperture in the retainer frame 62, and the member 54 carrying the retainer frame will pivot upon the cross-rod 50. Thus, the wheel assemblies may be raised from their lowered position shown in dotted lines in Figure 2, to the full line position shown therein, at which time the wheels are disposed substantially flat against the sides of the body in a very compact arrangement.

Referring again particularly to Figure 6 it will be seen that a spindle 70 consisting of a tube is disposed in abutting engagement with the member 54 and surrounds the internally threaded stem 60 of the retainer. Journaled upon this spindle is the supporting wheel 72. A single combined means is provided for securing the wheel upon the spindle, securing the spindle to the member 54, and locking the member 54 in adjusted position upon the brace rod 66 in either the erected or in the collapsed or folded position of the wheel assembly. This means consists of a bolt or rod 74 which is received within the sleeve 70, and which at its screw threaded extremity 76 engages in the internally threaded stem 60 of the retainer, and which at its other end is provided with a head 78 adapted to abut the spindle 70 and clamp the same firmly against the member 54. The head is provided with a handle 80 whereby the rod 74 may be manipulated to selectively clamp the wheel assembly in either its folded or opened positions, or for disassembling these parts as desired.

From the foregoing it will now be apparent that when the rod 74 is manipulated, the same will be caused to move the retainer frame 62 inwardly of the member 54 and thus cause the retainer frame to clampingly engage the brace rod 66 and lock the same against the member 54. Thus, the member 54 will be locked against pivoting movement on the cross-rod 50, will be locked against sliding movement on the brace rod 66, and thus will be firmly held in either its folded or its erected position.

With this arrangement, the entire golf bag cart may be collapsed into a very small and compact bundle to facilitate its transportation or storage, and yet may be quickly opened or erected into its assembled position to function as a golf caddy cart.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a golf bag cart, a body having means for receiving and supporting golf clubs and a foldable wheel assembly on said body, said wheel assembly including at least one support, means mounting said support upon said body for pivoting movement thereon between an extended and a folded position, a member pivotally mounted upon said support, a spindle journaling a supporting wheel thereon, a brace rod pivoted to said body, a retainer on said member engaging said brace rod and slidable thereon upon pivoting of said support, means securing said spindle to said member for pivotal movement therewith and for securing said retainer in slidably adjusted position upon said brace rod.

2. The combination of claim 1 wherein said support includes a pair of legs connected at one end by a cross rod, said member being journaled on said cross rod, said mounting means pivoting the other end of each leg to said body.

3. The combination of claim 1 wherein said member has a guide bore therein, said retainer being slidably received in said bore and slidably receiving said brace rod, said securing means operatively engaging said retainer and said member for moving said retainer in said bore.

4. The combination of claim 1 wherein said member has a guide bore therein, said retainer being slidably received in said bore and slidably receiving said brace rod, said securing means operatively engaging said retainer and said member for moving said retainer in said bore, said spindle comprising a tube having abutting engagement with said member, said securing means consisting of a bolt extending through said tube and having a head engaging the outer end of the tube and a threaded engagement with said retainer.

5. The combination of claim 1 wherein said member has a guide bore therein, said retainer being slidably received in said bore and slidably receiving said brace rod, said securing means operatively engaging said retainer and said member for moving said retainer in said bore, said spindle comprising a tube having abutting engagement with said member, said securing means consisting of a bolt extending through said tube and having a head engaging the outer end of the tube and a threaded engagement with said retainer, the head of said bolt comprising means for retaining said wheel on said spindle.

6. The combination of claim 1 including a supporting leg secured to said body and cooperating with said wheels for supporting the body in a standard position.

References Cited in the file of this patent

UNITED STATES PATENTS

| | | |
|---|---|---|
| 1,965,943 | Lea | July 10, 1934 |
| 2,679,876 | Schall | June 1, 1954 |